United States Patent
Mutya et al.

(10) Patent No.: US 8,428,239 B2
(45) Date of Patent: Apr. 23, 2013

(54) PROVIDING AN OPTION TO SUBSTITUTE A LOCAL RINGBACK TONE AT A CALLING PARTY DEVICE

(75) Inventors: Subbarayudu Mutya, Hyderabad (IN); Debesh Kumar Sahu, Hyderabad (IN); Venkata Krishna Murthy Jayavarapu, Pragadavaram (IN); Ashish Malik, Aurangabad (IN); Vvd Subrahmanyam Kalepu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 12/984,454

(22) Filed: Jan. 4, 2011

(65) Prior Publication Data

US 2012/0076289 A1  Mar. 29, 2012

Related U.S. Application Data

(60) Provisional application No. 61/385,861, filed on Sep. 23, 2010.

(51) Int. Cl.
*H04M 3/42* (2006.01)

(52) U.S. Cl.
USPC .................................................. 379/207.16

(58) Field of Classification Search ............. 379/207.06, 379/207.16
See application file for complete search history.

(56) References Cited

U.S. PATENT DOCUMENTS

| 5,528,672 | A | 6/1996 | Wert |
| 6,385,308 | B1 | 5/2002 | Cohen et al. |
| 7,171,200 | B2 | 1/2007 | No et al. |
| 7,242,756 | B2 | 7/2007 | Hahm et al. |
| 7,471,783 | B1 | 12/2008 | Shen et al. |
| 7,512,421 | B2 | 3/2009 | Kim et al. |
| 7,664,236 | B2 | 2/2010 | Radziewicz et al. |
| 2006/0245571 | A1 | 11/2006 | Radziewicz et al. |
| 2006/0285675 | A1 | 12/2006 | Radziewicz et al. |
| 2007/0286401 | A1 * | 12/2007 | Siddiqui et al. ............... 379/372 |
| 2007/0286402 | A1 * | 12/2007 | Jacobson ...................... 379/372 |
| 2008/0192900 | A1 | 8/2008 | Liu |
| 2009/0022283 | A1 | 1/2009 | Pollitt |
| 2009/0196403 | A1 | 8/2009 | Park et al. |
| 2010/0022219 | A1 | 1/2010 | Wang et al. |
| 2010/0054428 | A1 | 3/2010 | Wang et al. |

FOREIGN PATENT DOCUMENTS

| EP | 1686781 A1 | 8/2006 |
| EP | 1890471 A1 | 2/2008 |
| EP | 1956815 A1 | 8/2008 |

OTHER PUBLICATIONS

International Search Report and Written Opinion—PCT/US2011/052295—ISA/EPO—Nov. 11, 2011.
3GPP TS 24.008 V10.2.0, 3rd Generation Partnership Project; Technical Specification Group Core Network and Terminals; Mobile radio interface Layer 3 specification; Core network protocols; Stage 3 (Release 10), Mar. 2011, pp. 1-634.

\* cited by examiner

*Primary Examiner* — Creighton Smith
(74) *Attorney, Agent, or Firm* — Heejong Yoo

(57) ABSTRACT

A method for playing a local ringback tone is disclosed. A second party device is called from a calling party device. An alert message indicating that the calling party device is to play a network ringback tone is received. It is determined whether to play a pre-stored local ringback tone instead of the network ringback tone. The local ringback tone or the network ringback tone is played based on the determination. At any time before call connection or call release, the local ringback tone and the network ringback tone are switched between based on user input.

36 Claims, 11 Drawing Sheets

PROVIDING AN OPTION TO SUBSTITUTE A LOCAL RINGBACK TONE AT A CALLING PARTY DEVICE

RELATED APPLICATIONS

This application is related to and claims priority from U.S. Provisional Patent Application Ser. No. 61/385,861 filed Sep. 23, 2010, for "Providing an Option to Substitute a Local Ringback Tone at a Calling Party Device."

TECHNICAL FIELD

The present disclosure relates generally to electronic devices for communication systems. More specifically, the present disclosure relates to providing an option to substitute a local ringback tone at a calling party device.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Wireless communication systems are widely deployed to provide various types of communication content such as voice, video, data and so on. These systems may be multiple-access systems capable of supporting simultaneous communication of multiple wireless communication devices with one or more base stations.

While waiting for the conversation to start with a called party, users are accustomed to hearing a ringing sound. However, a variety of sounds may be played during this time. Therefore, benefits may be realized by providing an option to substitute a local ringback tone at a calling party device.

SUMMARY OF THE INVENTION

A method for playing a local ringback tone is disclosed. A second party device is called from a calling party device. An alert message indicating that the calling party device is to play a network ringback tone is received. It is determined whether to play a pre-stored local ringback tone instead of the network ringback tone. The local ringback tone or the network ringback tone is played based on the determination. At any time before call connection or call release, the local ringback tone and the network ringback tone are switched between based on user input.

The alert message may include a specific parameter or information indicating that the network ringback tone is being sent to the calling party. The determining may include determining if a substitute flag that indicates that the local ringback tone should be substituted for the network ringback tone is true. The substitute flag may be set to true based on an entry in a calling party device phonebook for the second party device. The substitute flag may be set to true based on user input received via a keypad on the calling party device only in the absence of an entry in the calling party device phonebook for the second party device. The playing may include sending the local ringback tone to a vocoder in the calling party device if the substitute flag is true and sending the network ringback tone to the vocoder if the substitute flag is false.

The network ringback tone may be received from a network device. An indication message indicating that a connection has been made with the second party device may be received and the playing of the local ringback tone or network ringback tone may be stopped in response to the indication message. The switching may include switching based on user input from a hot key in a keypad of the calling party device or a selection within a user interface.

An apparatus for playing a local ringback tone is also disclosed. The apparatus includes a processor and memory in electronic communication with the processor. Executable instructions are stored in the memory. The instructions are executable to call a second party device. The instructions are also executable to receive an alert message indicating the calling party device is to play a network ringback tone. The instructions are also executable to determine whether to play a pre-stored local ringback tone instead of the network ringback tone. The instructions are also executable to play the local ringback tone or the network ringback tone based on the determination. The instructions are also executable to switch, at any time before call connection or call release, between the local ringback tone and the network ringback tone based on user input.

A calling party device for playing a local ringback tone is also disclosed. The calling party device includes means for calling a second party device. The calling party device also includes means for receiving an alert message indicating the calling party device is to play a network ringback tone. The calling party device also includes means for determining whether to play a pre-stored local ringback tone instead of the network ringback tone. The calling party device also includes means for playing the local ringback tone or the network ringback tone based on the determination. The calling party device also includes means for switching, at any time before call connection or call release, between the local ringback tone and the network ringback tone based on user input.

A computer-program product for playing a local ringback tone is also disclosed. The computer-program product comprises a non-transitory computer-readable medium having instructions thereon. The instructions include code for causing a calling party device to call a second party device. The instructions also include code for causing the calling party device to receive an alert message indicating the calling party device is to play a network ringback tone. The instructions also include code for causing the calling party device to determine whether to play a pre-stored local ringback tone instead of the network ringback tone. The instructions also include code for causing the calling party device to play the local ringback tone or the network ringback tone based on the determination. The instructions also include code for causing the calling party device to switch, at any time before call connection or call release, between the local ringback tone and the network ringback tone based on user input.

DETAILED DESCRIPTION

Mobile electronic devices may play a ringback tone (RBT) on a calling party's earpiece while waiting for a call to connect. Often times, the played RBT is not selected by the person hearing it. Sometimes, the selected RBT may not be acceptable to the calling party. Instead, the calling party may desire a different RBT be played. Currently, there are features available on the network side to allow a calling party to substitute RBTs with its own selected tone/customized tones, etc. There are also features available to customize RBTs per subscriber. However, these options do not allow the calling party to ignore or substitute RBTs at the calling party device itself.

Therefore, the present systems and methods enable a calling party device to initiate substitution of a network ringback tone with a local ringback tone, i.e., without changes to or permission from the network. This substitution may be predetermined by a particular entry in a phonebook or made during runtime, i.e., while waiting for a connection. A local flag at the calling party device may be used to play a customized RBT. The local flag may indicate that a local RBT should be substituted for the RBT chosen by the network side. Therefore, when the calling party device receives an ALERT message that indicates a network RBT should be played to the user and the local flag is true, the calling party device may play the local RBT instead of the network RBT. The local flag may be set in an entry in the phonebook of the calling party device or by pressing a key on the keypad of the calling party device. When an indication is received that a connection has been made, the local RBT may stop playing. With this solution, a calling party may choose to enable/disable/play its own local tune instead of the network RBT during the call setup. This provides flexibility to the calling party and may be compatible with any network (home or serving network). Additionally, this may reduce common issues with roaming and RBT substitution.

Figure 1:
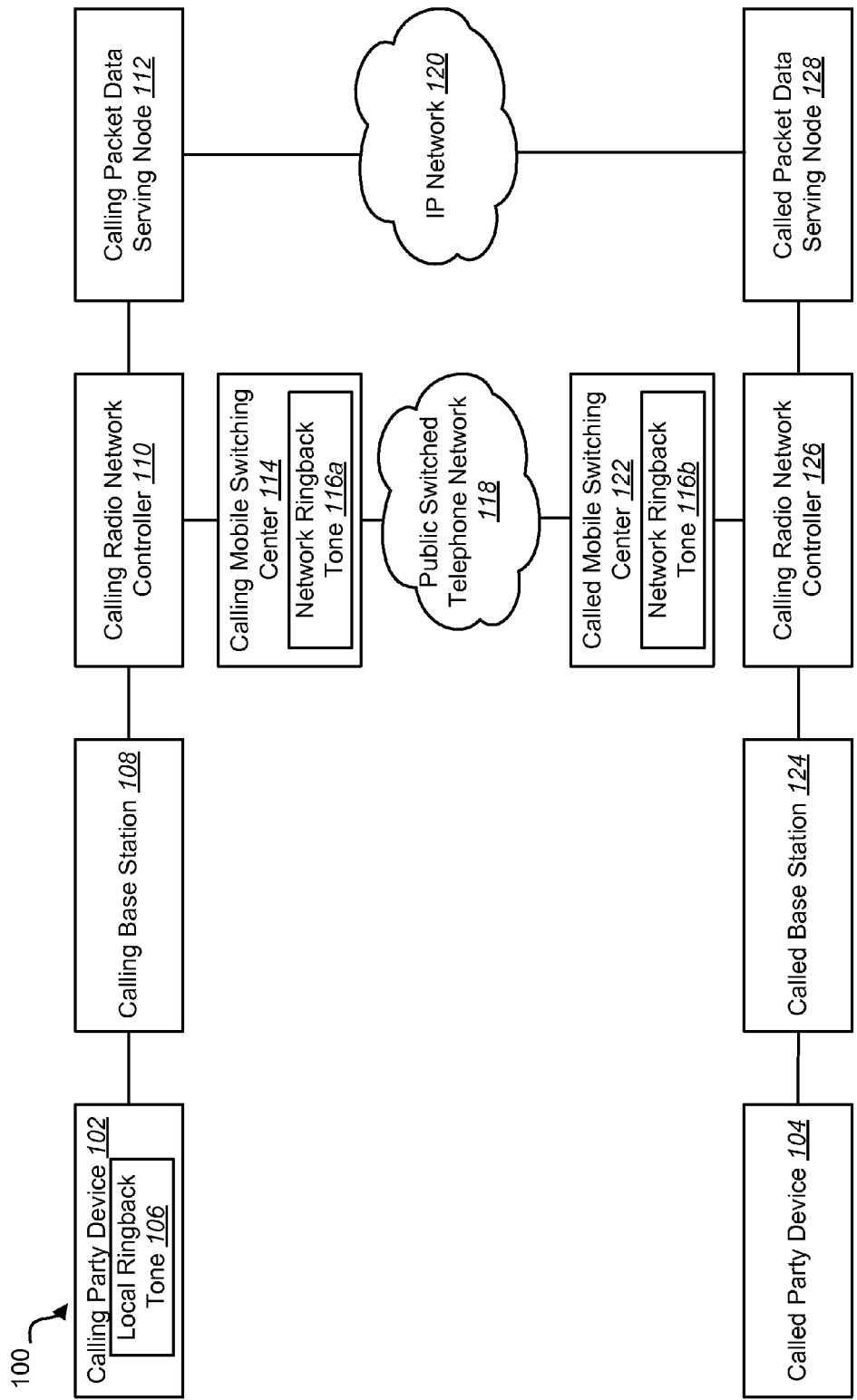
FIG. 1 is a block diagram illustrating a system for providing an option to substitute a local ringback tone (RBT) at a calling party device.

FIG. 1 is a block diagram illustrating a system 100 for providing an option to substitute a local ringback tone (RBT) 106 at a calling party device 102. The system 100 may include a calling party device 102 that calls a called party device 104, both of which may be wireless communication devices. As used herein, the term "wireless communication device" refers to an electronic device that may be used for voice and/or data communication over a wireless communication system. Examples of wireless communication devices include cellular phones, personal digital assistants (PDAs), handheld devices, wireless modems, laptop computers, personal computers, etc. A wireless communication device may alternatively be referred to as an access terminal, a mobile terminal, a mobile station, a remote station, a user terminal, a terminal, a subscriber unit, a subscriber station, a mobile device, a wireless device, user equipment (UE) or some other similar terminology.

The calling party device 102 may communicate with a calling base station 108. The term "base station" refers to a wireless communication station that is installed at a fixed location and used to communicate with wireless communication devices. A base station may alternatively be referred to as an access point, a Node B, an evolved Node B or some other similar terminology. Furthermore, the term "calling," when used with respect to network devices, refers to network infrastructure devices serving the calling party device 102, e.g., the calling base station 108 serves the calling party device 102. Similarly, the term "called" refers to network infrastructure devices serving the called party device 104, e.g., the called base station 124 serves the called party device 104. Alternatively, the calling party device 102 and the called party device 104 may one or more network devices.

The calling base station 108 communicates with a calling radio network controller 110 (also referred to as a base station controller or packet control function). The calling radio network controller 110 communicates with a calling mobile switching center (MSC) 114, a calling packet data serving node (PDSN) 112 or internetworking function (IWF), a public switched telephone network (PSTN) 118 (typically a telephone company) and an Internet Protocol (IP) network 120 (typically the Internet). The calling mobile switching center 114 is responsible for managing the communication between the calling party device 102 and the public switched telephone network 118 while the calling packet data serving node 112 is responsible for routing packets between the calling party device 102 and the IP network 120.

Similarly, the called base station 124 communicates with a called radio network controller 126 (also referred to as a base station controller or packet control function). The called radio network controller 126 communicates with a called mobile switching center (MSC) 122, a called packet data serving node (PDSN) 128 or internetworking function (IWF), a public switched telephone network (PSTN) 118 (typically a telephone company) and an Internet Protocol (IP) network 120 (typically the Internet). The called mobile switching center 122 is responsible for managing the communication between the called party device 104 and the public switched telephone network 118 while the called packet data serving node 128 is responsible for routing packets between the called party device 104 and the IP network 120.

When the calling party device 102 calls the called party device 104, a ringback tone may be played at the calling party device 102. A ringback tone (RBT) is the song or sound that is heard on the telephone line by the calling party after dialing and prior to the call being answered at the receiving end. This tone assures the calling party that a ringing signal is being sent on the called party's line, although the ringback tone may be out of sync with the ringing signal. There is also personalized version of RBT available, which is known as a color ringback tone (CRBT). Ringback tones may be audio simulating a telephone ringing, silence or a recorded song.

In one configuration, the ringback tone played at the calling party device may be a network ringback tone 116a-b. The network ringback tone 116a-b may be generated by the called party servicing switch (S-MSC) 122 or by the calling party switch (O-MSC) 114, but it is not usually generated by the originating telephone instrument, i.e., the calling party device 102. In other words, the network ringback tone 116a-b may be selected by the user of the called party device 104 independent of the calling party device 102 preferences, e.g., the called party device 104 user may subscribe to a service where they are able to select a ringback tone to be played at all devices calling the called party device 104.

Since there are many benefits to network operators from RBTs, operators are offering a variety of content (tunes), updating content at regular intervals and deploying a secure technology to drive the content. In some circumstances, ringback tones may also be unwanted or annoying.

For example, users may participate in conference calls using cell phones. A business executive may initiate a conference call in front of his customers with some of his office colleagues and senior management also on the call. The called party device 104 may be a ringback tone subscriber. It may not be desirable to listen to the network ringback tone 116a-b (usually not heard by the customer) in this circumstance. However, the calling party device 102 may not have an option to substitute the network ringback tone 116a-b with a different ringing tone. Therefore, a person in this situation may desire their handset to include an option to substitute local ringback tones 106 instead of the network ringback tones 116a-b.

Additionally, a teenager may have unusual ringback tones set for their cell phone connections. However, their parents, who hear those ringback tones, may not enjoy their child's selection, e.g., rock song with outrageous lyrics. The parents may desire an option to switch those tones to something more pleasant and calm. If the option were available on their handsets, it would be very easy to use without paying additional subscription charges to the carrier or persuading their kids to change those tones.

With the increasing popularity of ringback tones, it may become even more desirable for every end user to have an option at his/her device end, so that he/she can choose to substitute whenever he/she wants depending upon the situation. For example, customer service phone calls may employ marketing ringback tones as well as other commercial/marketing tones that might be annoying to the caller. In that case, the caller may desire to play the substitute tone (i.e., local ringback tone 106) instead of the network RBT 116a-b.

One possible way to substitute for a network ringback tone 116a-b may be to have the network ringback tone 116a-b substituted in the network infrastructure, e.g., the calling MSC 114 or called MSC 122 could send a desired ringback tone to the calling party device 102 instead of the network ringback tone 116a-b. However, this would be implemented at the network and the end user may need to pay subscription charges to his/her carrier. Furthermore, this filtering mechanism is network dependent. All networks may not have implemented this. In other words, end users may not get this service across different types of networks. Therefore, disabling or changing RBTs may not always work in roaming scenarios, e.g., the new serving network doesn't have support for this service. Additionally, these network-implemented filters may be configured only once, so the end user doesn't have flexibility to select a different option during runtime, i.e., after dialing and prior to the call being answered at the receiving end.

Therefore, the present systems and methods enable the wireless communication device to play a local ringback tone 106 instead of a network ringback tone 116a-b. This screening and substitution may occur within the calling party device 102 without modification to other devices, e.g., the calling MSC 114, called MSC 122, etc. In other words, the present systems and methods do not require additional network RBT blocking/substitution, additional subscriber services on the network or additional remote servers for media content. While described in terms of UMTS technology, the present systems and methods are applicable to CDMA2000, GSM and possible other telephonic technologies as well.

More specifically, based on entries in the phonebook of the calling party device 102 and/or user input, the calling party device 102 may play the local ringback tone 106 instead of the received network ringback tone 116a-b. When an ALERT signal is received and a network ringback tone 116a-b is received by the calling party device 102, it may screen the network ringback tone 116a-b, also known as the personalized ringback tone (PRBT), based on the settings in a phonebook for the called party device 104. The phonebook may be in a removable SIM (Subscriber Identity Module) card or other removable media. Therefore, if a SIM card is moved to a different mobile device, the new mobile device may also screen the network ringback tone 116a-b based on the phonebook entries. If the called party device 104 is not found in the phonebook, then the decision may be based on the user input. Furthermore, at any time before the remote user answers the call or the call gets connected, the user of the calling party device 102 may be given an option of switching between the network ringback tone 116a-b and the local ringback tone 106. This is referred to as runtime switching. For example, if the user of the calling party device 102 selects a local ringback tone 106, the user may still switch to the personalized ringback tone of the called party device 104 (i.e., the network ringback tone 116a-b) because the user may turn off the screening indicator in the phonebook entry for that remote user by pressing a hot key, i.e., a key that invokes particular functionality such as ringback tone substitution.

Figure 2:
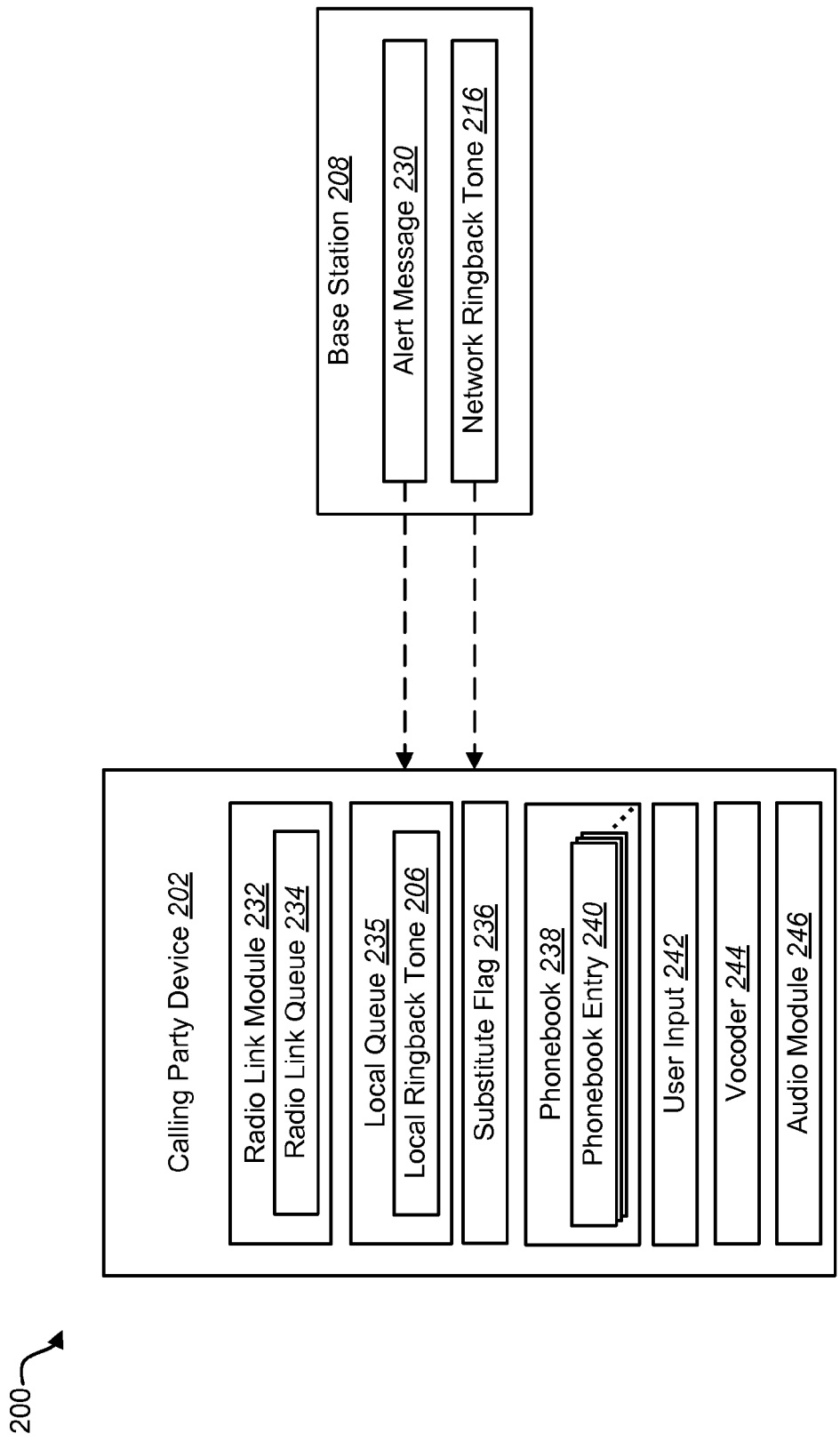
FIG. 2 is a block diagram illustrating a system for providing an option to substitute a local ringback tone at a calling party device.

FIG. 2 is a block diagram illustrating a system 200 for providing an option to substitute a local ringback tone 206 at a calling party device 202. In one configuration, the calling party device 202 may be a wireless communication device that communicates with a base station 208.

The calling party device 202 may initiate a phone call to a second called party device (not shown). During call setup, the calling party device 202 may exchange various signaling with the called party device via the base station 208. For example, the base station 208 may serve both the calling party device 202 and the called party device. Alternatively, the base station 208 may serve only the calling party device 202. Once a traffic channel is established, the base station 208 may receive and forward an alert message 230 to the calling party device 202. Among other things, the alert message 230 may indicate that a network ringback tone 216 is being transmitted on the traffic channel for the calling party device 202 to play to the user. After receiving the alert message 230, a radio link module 232 may receive and store the network ringback tone 216 in a radio link queue 234. Depending on whether the calling party device uses UMTS, CDMA2000 or GSM, the alert message 230 and radio link module 232, among other elements, may be implemented differently.

As mentioned above, a user of the calling party device 202 may desire to substitute a local ringback tone 206 for the network ringback tone 216. Therefore, the calling party device 202 may determine whether to substitute the local ringback tone 206 in the local queue 235 for the network ringback tone 216 stored in the radio link queue 234. If the local ringback tone 206 is to be substituted for the network ringback tone 216, a substitute flag 236 may be set TRUE, e.g., a designated bit may be set to "1". However, if the local ringback tone 206 is not to be substituted for the network ringback tone 216, the substitute flag may be set FALSE, e.g., a designated bit may be set to "0". In one configuration, setting the substitute flag 236 may include determining whether there is a substitution indication in the phonebook entry 240 for the called party device.

The "phonebook" 238, as used herein, refers to a collection of contact data relating to users of other communication devices, e.g., the phonebook entries 240 may include the names, phone number(s), address, e-mail address, etc. of other people with whom the user of the calling party device 202 has or will likely communicate. The phonebook may reside on a SIM (Subscriber Identity Module) card or other removable media. Part of each phonebook entry 240 may be data that indicates whether the local ringback tone 206 should be played instead of the network ringback tone 216, e.g., a predetermined bit. If the phonebook entry 240 indicates substitution, the substitute flag 236 may be set to TRUE. However, if the phonebook entry 240 indicates non-substitution, the substitute flag 236 may be set to FALSE. However, the phonebook entry 240 for the called party may not indicate substitution or non-substitution of the local ringback tone 206 for the network ringback tone 216, e.g., there is no phonebook entry 240 for the called party device. In one configuration, the calling party device 202 may use user input 242 only after the calling party device has confirmed that the phonebook entry 240 for the called party device does not include an indication of whether the local ringback tone 206 should be substituted for the network ringback tone 216. In other words, the user input 242 may only be used in the absence of an indication in the appropriate phonebook entry 240. Alternatively, the user input 242 may supersede the phonebook entry 240. For example, the substitute flag 236 may be set using the phonebook entry 240, but changed according to user input 242, when present, e.g., a hot key may be programmed on the calling party device 202 to change the selection of ringback tones at any time prior to call connection. Alternatively, a default selection may be made if there is a phonebook entry 240 indication that conflicts with user input 242. For example, if the phonebook entry 240 for the called party indicates non-substitution and the user input 242 indicates substitution, the calling party device 202 may substitute the local ringback tone 206 for the network ringback tone 216, i.e., substitution or non-substitution is the default in the event of conflicting indications in the phonebook entry 240 and the user input 242.

After a ringback tone is selected, it may be decoded. Specifically, the local ringback tone 206 may be sent to the vocoder 244 if substitution is desired. Alternatively, if substitution is not desired, the network ringback tone 216 may be sent to the vocoder 244. The decoded ringback tone may then be played by an audio module 246 to the user while they wait for call connection (or until the call is released before connection).

Figure 3:
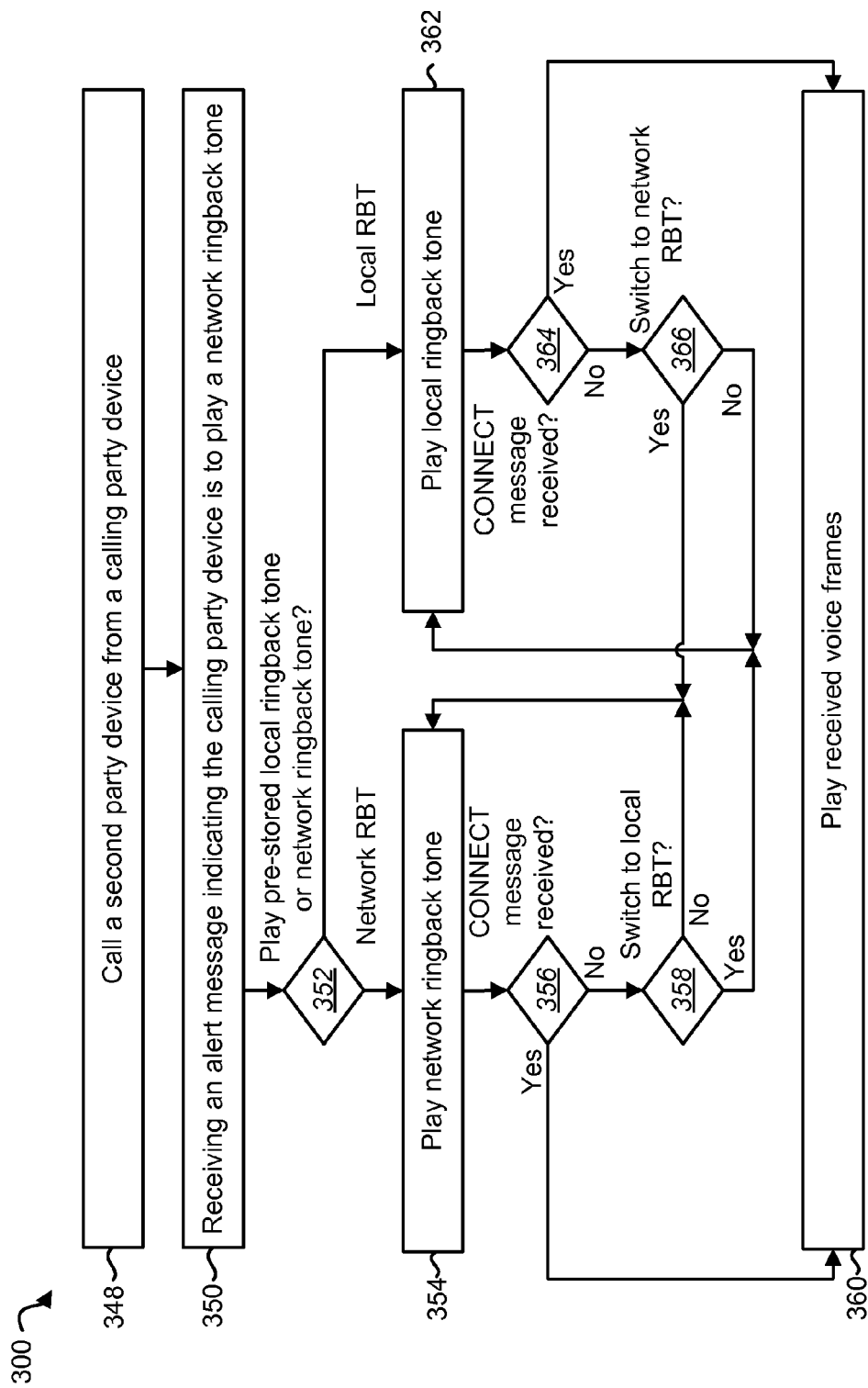
FIG. 3 is a flow diagram illustrating a method for providing an option to substitute a local ringback tone at a calling party device.

FIG. 3 is a flow diagram illustrating a method 300 for providing an option to substitute a local ringback tone at a calling party device. The method 300 may be performed by a wireless communication device that calls another device, i.e., the method 300 may be performed by a calling party device.

The calling party device may call 348 a second party device. This may include establishing a traffic channel with various signaling. The calling party device may also receive 350 an alert message indicating the calling party device is to play a network ringback tone. In one configuration, the alert message may include a progress indicator that indicates a network ringback tone is being sent on the traffic channel. The calling party device may determine 352 whether to play a pre-stored local ringback tone or the network ringback tone. This initial determination may include checking a phonebook entry in the calling party device for an indication that substitution should be performed, i.e., that the local ringback tone should be played instead of the network ringback tone. If there is no phonebook entry, the calling party device may use received user input to determine if the local ringback tone should be played instead of the network ringback tone.

If the network ringback tone is initially selected, the calling party device may play 354 the network ringback tone and determine 356 whether a CONNECT message is received. If a CONNECT message is received, the calling party device may stop playing the network ringback tone and play 360 received voice frames. If no CONNECT message is received, the calling party device may determine 358 whether to switch to a local ringback tone. This may include receiving user input during runtime, i.e., after dialing and prior to the call being answered at the receiving end. Based on the runtime user input, the calling party device may continue to play 354 the network ringback tone or play 362 the local ringback tone.

If the local ringback tone is initially selected, the calling party device may play 362 the local ringback tone and determine 364 whether a CONNECT message is received. If a CONNECT message is received, the calling party device may stop playing the network ringback tone and play 360 received voice frames. If no CONNECT message is received, the calling party device may determine 366 whether to switch to a network ringback tone. This may include receiving user input during runtime, i.e., after dialing and prior to the call being answered at the receiving end. Based on the runtime user input, the calling party device may continue to play 362 the local ringback tone or play 354 the network ringback tone.

Figure 4:
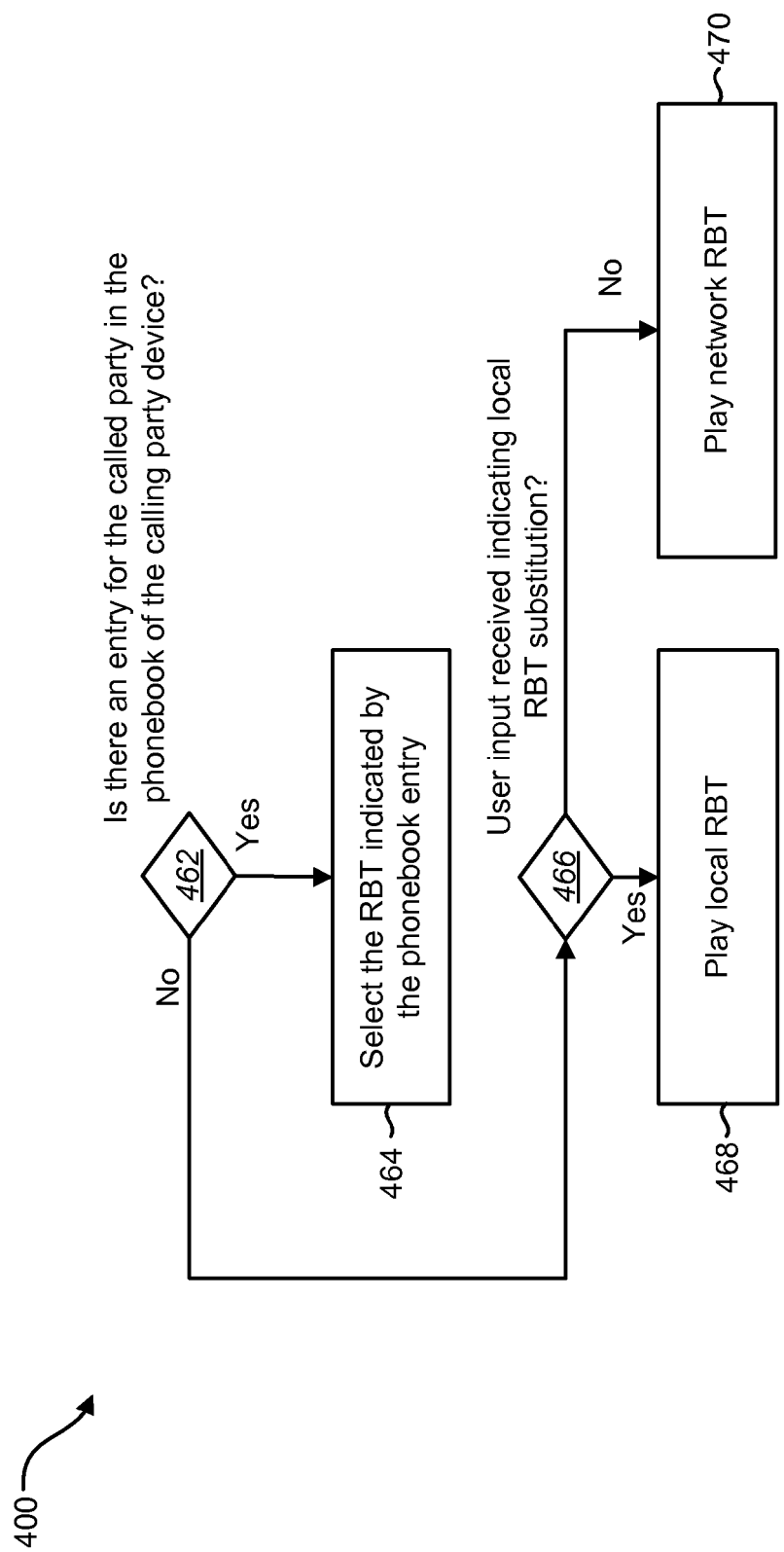
FIG. 4 is a flow diagram illustrating a method for providing an option to substitute a local ringback tone at a calling party device.

FIG. 4 is a flow diagram illustrating a method 400 for providing an option to substitute a local ringback tone at a calling party device. Specifically, the method 400 illustrates the initial determination of whether to play a local ringback tone instead of the network ringback tone, i.e., element 352 in FIG. 3. The method 400 may be performed by a wireless communication device that calls another device, i.e., the method 400 may be performed by a calling party device.

The calling party device may determine 462 whether there is a phonebook entry for the called party. If there is, the calling party device may select 464 the ringback tone indicated by the phonebook entry. For example, part of each phonebook entry may be data that indicates whether the local ringback tone should be played instead of the network ringback tone, e.g., a predetermined bit. If the phonebook entry indicates substitution, the local ringback tone may be played. However, if the phonebook entry indicates non-substitution, the network ringback tone may be selected.

If there is no phonebook entry for the called party, the calling party device may determine 466 whether user input is received that indicates local ringback tone substitution. If yes, the calling party device may play 468 the local ringback tone. If no, the calling party device may play 470 the network ringback tone. In one configuration, the user input may only be used in the absence of an indication in the appropriate phonebook entry. Alternatively, the user input may supersede the phonebook entry 240, i.e., the user input may take precedent over any phonebook entries. For example, a hot key may change the initial selection of ringback tones. Alternatively, a default selection may be made if there is a phonebook entry indication that conflicts with user input.

Figure 5:
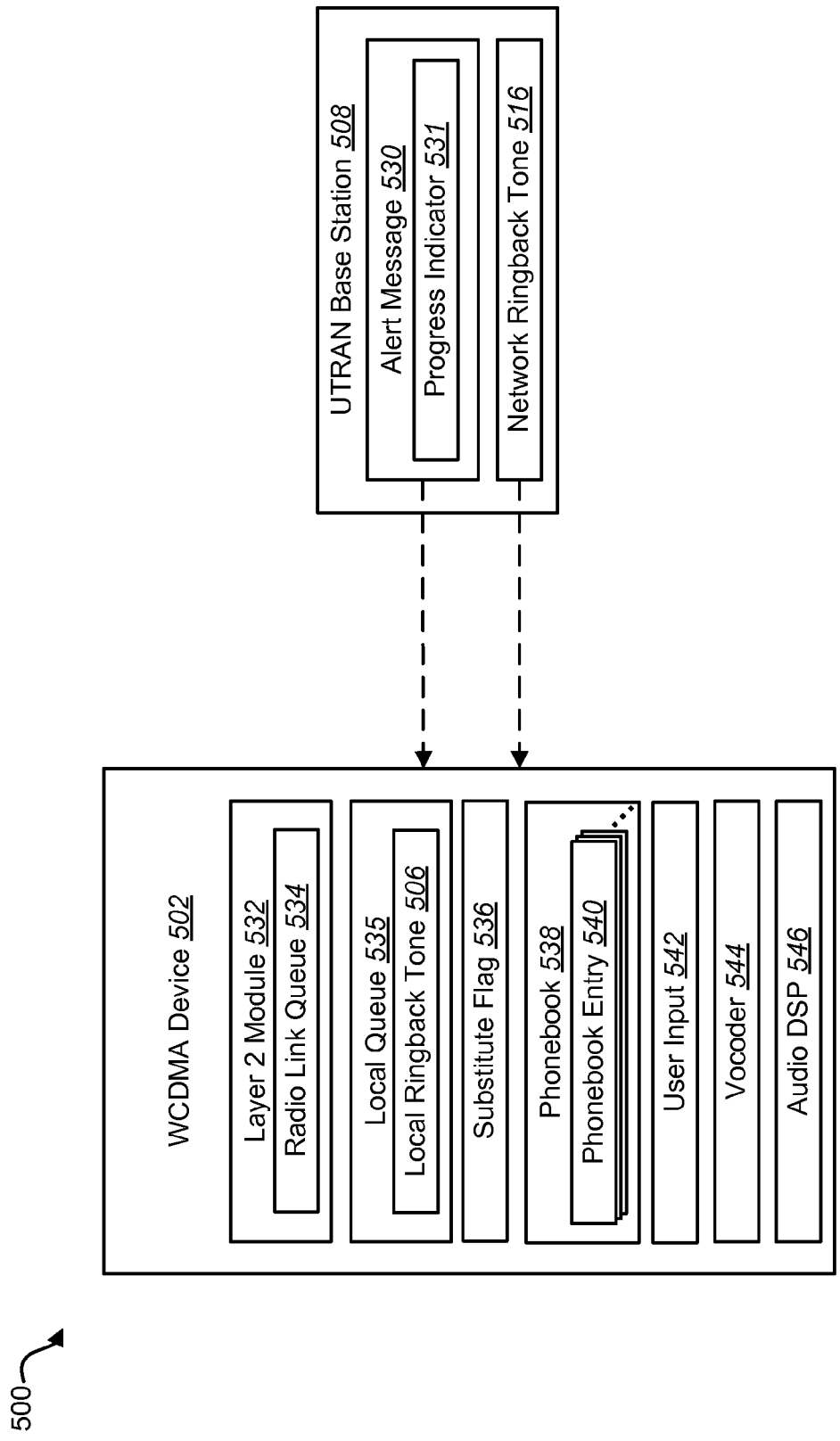
FIG. 5 is a block diagram illustrating a system for providing an option to substitute a local ringback tone at a WCDMA device.

FIG. 5 is a block diagram illustrating a system 500 for providing an option to substitute a local ringback tone 506 at a WCDMA device 502. The WCDMA device 502 communicates with a UTRAN (UMTS Radio Access Network) base station 508.

The WCDMA device 502 may initiate a phone call to a second called party device (not shown). During call setup, the calling party device 502 may exchange various signaling with the called device via the base station 508, e.g., origination message, traffic channel assignment message, acknowledgement message, etc. The base station may serve both the calling party device 502 and the called party device. Alternatively, the base station 508 may serve only the calling party device 502. Once a traffic channel is established, the base station 508 may receive and forward an alert message 530 to the calling party device 502. The alert message 530 may include a progress indicator 531. After receiving the alert message 530, a layer 2 module 532 may receive and store the network ringback tone 516 in a radio link queue 534. Depending on whether the calling party device uses UMTS, CDMA2000 or GSM, the alert message 530 and layer 2 module 532 may be implemented differently.

A user of the WCDMA device 502 may desire to substitute a local ringback tone 506 for the network ringback tone 516. Therefore, the WCDMA device 502 may determine whether to substitute the local ringback tone 506 in the local queue 535 for the network ringback tone 516 stored in the radio link queue 534. If the local ringback tone 506 is to be substituted for the network ringback tone 516, a substitute flag 536 may be set TRUE, e.g., a designated bit may be set to "1". However, if the local ringback tone 506 is not to be substituted for the network ringback tone 516, the substitute flag may be set FALSE, e.g., a designated bit may be set to "0".

In one configuration, setting the substitute flag 536 may include determining whether there is a substitution indication in the phonebook entry 540 for the called party device. Part of each phonebook entry 540 may be data that indicates whether the local ringback tone 506 should be played instead of the network ringback tone 516, e.g., a predetermined bit. If the phonebook entry 540 indicates substitution, the substitution flag 536 may be set to TRUE. However, if the phonebook entry 540 indicates non-substitution, the substitution flag 536 may be set to FALSE. However, the phonebook entry 540 for the called party may not indicate substitution or non-substitution of the local ringback tone 506 for the network ringback tone 516. The phonebook 538 may be stored in a SIM (Subscriber Identity Module) card or other removable media.

In one configuration, the WCDMA device 502 may use user input 542 only after the WCDMA device 502 has confirmed that the phonebook entry 540 for the called party device does not include an indication of whether the local ringback tone 506 should be substituted for the network ringback tone 516. In other words, the user input 542 may only be used in the absence of an indication in the appropriate phonebook entry 540. Alternatively, the user input 542 may supersede the phonebook entry 540. For example, the substitute flag 536 may be set using the phonebook entry 540 but changed according to user input 542 when present, e.g., a hot key may be programmed on the WCDMA device 502 to change the selection of ringback tones at any time prior to call connection. Alternatively, a default selection may be made if there is a phonebook entry 540 indication that conflicts with user input 542. For example, if the phonebook entry 540 for the called party indicates non-substitution and the user input 542 indicates substitution, the WCDMA device 502 may substitute the local ringback tone 506 for the network ringback tone 516 by default.

After a ringback tone is selected, it may be decoded. Specifically, the local ringback tone 506 may be sent to the vocoder 544 if substitution is desired. Alternatively, if substitution is not desired, the network ringback tone 516 may be sent to the vocoder 544. The decoded ringback tone may then be played by an audio DSP (digital signal processor) 546 to the user while they wait for call connection (or if the call is released before connection).

Figure 6:
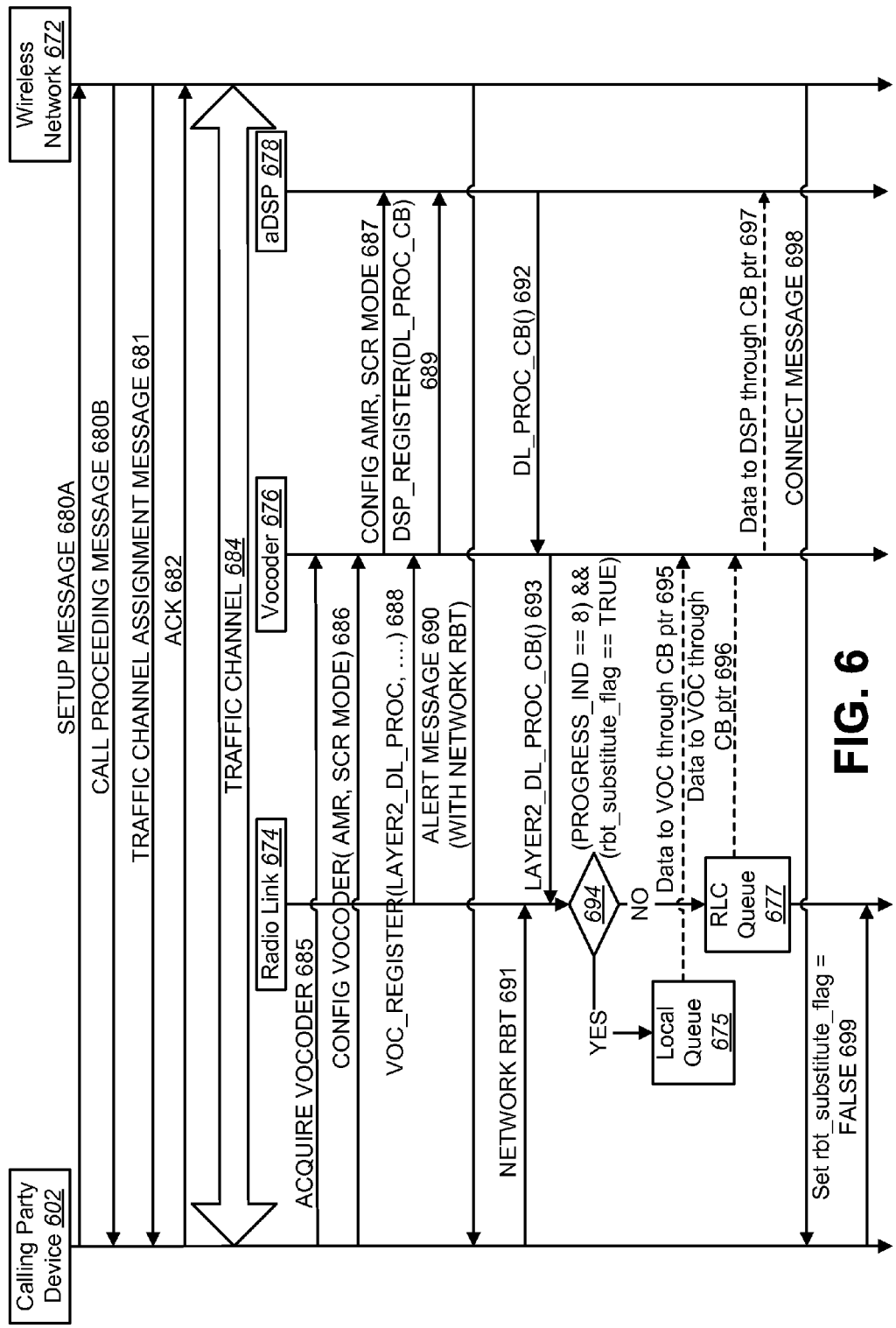
FIG. 6 is a sequence diagram illustrating signaling between a calling party device and a wireless network.

FIG. 6 is a sequence diagram illustrating signaling between a calling party device 602 and a wireless network 672. The calling party device 602 may be a WCDMA (Wideband Code Division Multiple Access) wireless communication device and the wireless network 672 may be a UMTS (Universal Mobile Telecommunications System) Radio Access Network (UTRAN). The radio link 674 entity represents the layer 2 radio link module in the calling party device 602, the vocoder 676 represents the vocoder in the calling party device 602 and the aDSP (audio digital signal processor) 678 represents the audio DSP, or audio module, in the calling party device 602. The sequence diagram may be illustrated using WCDMA, however, the present systems and methods are applicable to other wireless communication systems.

The SETUP message 680*a*, call proceeding message 680*b*, traffic channel assignment message 681 and ACK 682 may be used to establish the traffic channel 684. The calling party device 602 may acquire 685 and configure 686 the vocoder 676. The vocoder 676 may then configure 687 the aDSP 678. During call setup, a radio link module 674 may register 688 its callbacks to enable a vocoder to receive frames received over the Air Interface (OTA). Similarly, the vocoder 676 registers 689 with its callbacks for downlink with the AudioDSP (aDSP) 678.

Once the traffic channel 684 is established, network RBT audio frames may be received by the physical layer (Layer 1) of the calling party device on the traffic channel 684 following the reception of the ALERT message 690. The ALERT message 690 may notify the calling party device 602 when to start RBT play and a CONNECT message 698 may notify the calling party device 602 when to stop playing the RBT. In one configuration, the ALERT message includes a progress indicator with a value of 8 that indicates that the network RBT is also being sent on the traffic channel 684. The progress indicator may be seven bits that describes an event that has occurred during the life of a phone call. For example, a value of 8 may indicate that the network ringback tone is being sent. A check for this substitute flag and the progress indicator may be added in the existing callback function, which the vocoder 676 may call to receive frames from Layer 2. In other words, the local ringback tone may be substituted if the substitute flag is true and the progress indicator has a value of 8.

Table 1 illustrates possible values of the progress indicator. The table is taken from 3GPP TS 24.008, Section 10.5.4.21. In implementation, the progress indicator may include other information, with the progress description illustrated in Table 1 occupying only a portion of the progress indicator. A value of 8 indicates that in-band information is available, i.e., the network ringback tone is being sent to the calling party device 602. Alternatively, other values may describe different events that occur during the life of a call.

TABLE 1

Progress Indicator Descriptions
Progress description (octet 4)

| Bits | | | | | | | | |
|---|---|---|---|---|---|---|---|---|
| 7 | 6 | 5 | 4 | 3 | 2 | 1 | No. | |
| 0 | 0 | 0 | 0 | 0 | 0 | 1 | 1. | Call is not end-to-end PLMN/ISDN, further call progress information may be available in-band |
| 0 | 0 | 0 | 0 | 0 | 1 | 0 | 2. | Destination address in non-PLMN/ISDN |

TABLE 1-continued

Progress Indicator Descriptions
Progress description (octet 4)

| 7 | 6 | 5 | 4 | 3 | 2 | 1 | No. | |
|---|---|---|---|---|---|---|---|---|
| 0 | 0 | 0 | 0 | 0 | 1 | 1 | 3. | Origination address in non-PLMN/ISDN |
| 0 | 0 | 0 | 0 | 1 | 0 | 0 | 4. | Call has returned to the PLMN/ISDN |
| 0 | 0 | 0 | 1 | 0 | 0 | 0 | 8. | In-band information or appropriate pattern now available |
| 0 | 0 | 0 | 1 | 0 | 0 | 1 | 9. | In-band multimedia CAT available |
| 0 | 1 | 0 | 0 | 0 | 0 | 0 | 32. | Call is end-to-end PLMN/ISDN |
| 1 | 0 | 0 | 0 | 0 | 0 | 0 | 64. | Queueing |
| All other values | | | | | | | | Unspecific |

The caller's physical layer may demodulate and decode the network RBT audio frames and send 691 them to the RLC (Layer 2) 674 where they may be stored in a radio link queue 677. The audio module 678 may invoke 692 the vocoder 676 callbacks as per its own time sequence (e.g., every 20 ms) to receive vocoder 676 frames. This, in turn, may cause vocoder 676 to invoke 693 the Layer 2 callbacks to get frames received over the air (OTA).

In addition to receiving the network RBT with the alert message 690, the calling party device 602 may include a local queue 675 that includes a pre-stored local RBT. So the calling device 602 can provide the option to substitute the network RBT with local ringtones based on user input. A new substitute flag may be used. Depending upon the user's choice, the substitute flag may be set as "FALSE" or "TRUE," i.e., based on a phonebook entry and/or a keypad input. The end user may set this flag as per their choice. A FALSE value for the substitute flag may indicate that the network ringback tone should be played, e.g., the vocoder 676 should take from the radio link queue instead of the local queue. A TRUE for the substitute flag may indicate that the local ringback tone should be played instead of the network ringback tone (for the present call only), e.g., the vocoder should take from the local queue instead of the radio link queue. The substitute flag may be set TRUE based on user input or an entry in the phonebook of the wireless communication device. Similarly, the calling party device 602 may also set the substitute flag to FALSE while calling any number (e.g., while joining some conference call or calling to some Service Center etc).

When the vocoder 676 pulls the data from the radio link module 674 (i.e., RLC), the logic may check 694 for the substitute flag and based on its value, the local vocoder 676 samples (stored previously at the calling party device) may be sent 695 to the vocoder 676 instead of sending 696 the data from the radio link queue 677. In other words, the local ringback tone may be sent 695 to the vocoder 676 instead of the network ringback tone. The vocoder 676 may send 697 the frames to the aDSP 678 for playing. The substitute flag may be set 699 to FALSE when the calling party device 602 receives "CONNECT" 698 or "RELEASE/DISCONNECT" (not shown) so the wireless communication device plays the network ringback tone as a default during subsequent phone calls.

Sometimes end users may like to listen to a network RBT even if it is automatically substituted by a phonebook RBT screening indication. This functionality may enable a user to overwrite the phonebook RBT screening indication for that called party. At any point of time, during the local ringback tone play (i.e., when the substitute flag is TRUE), the user may be able to switch back to the network RBT of the called party. In one configuration, the calling party device may have a hot key on the keypad mapped to select or deselect RBT screening. While the network RBT is substituted with a local RBT, the user may press the RBT selection key to play the network RBT of the called party. This may be also achieved from user interface screen selection as well.

Figure 7A:
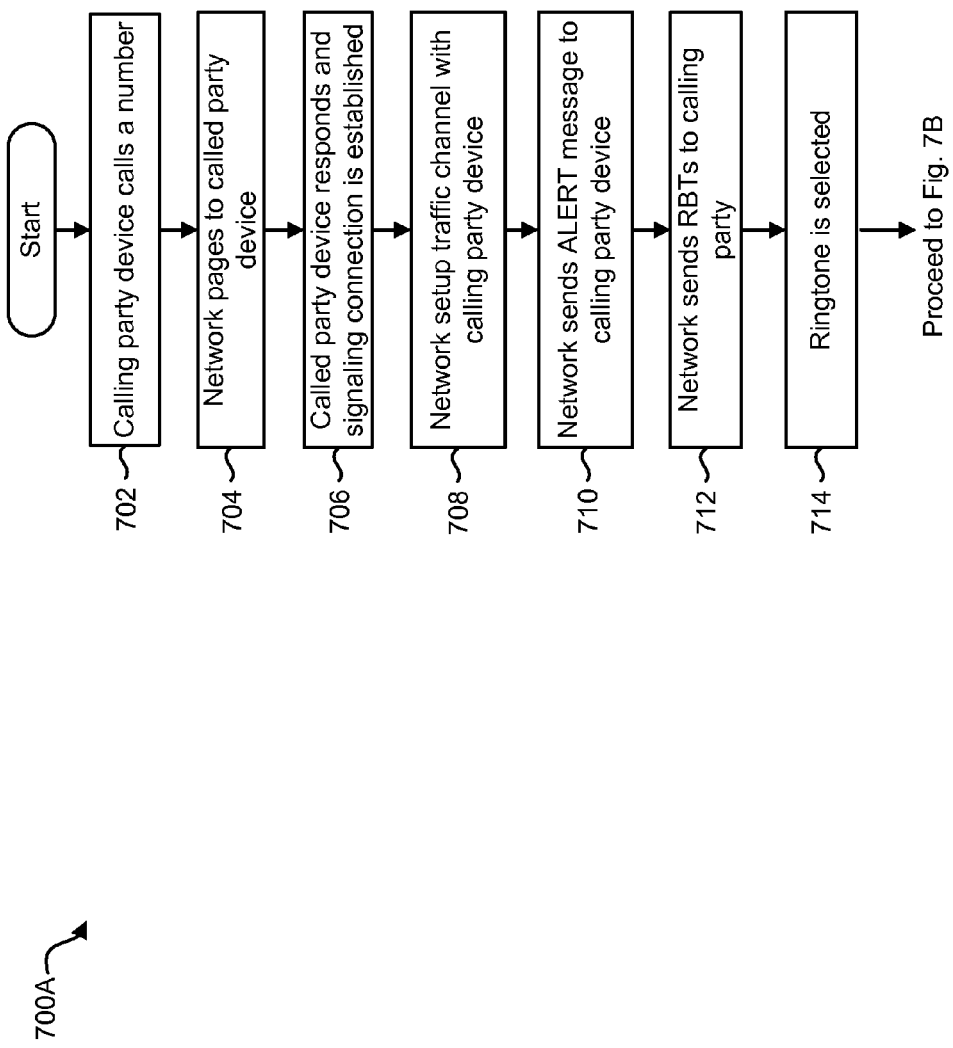
FIG. 7A is a flow diagram illustrating a method for providing an option to substitute a local ringback tone at a calling party device.

FIG. 7A is a flow diagram illustrating a method 700A for providing an option to substitute a local ringback tone at a calling party device. The method 700A may be performed in a wireless communication system, e.g., a calling party device, a called party device and one or more network devices, such as base stations.

The calling party device may initiate a phone call by calling 702 the number of the called party device. The network may page 704 the called party device. When the called party responds to the page, a signaling connection may be established 706 with the called party. The network may allocate resources and set up 708 a traffic channel with the calling party device. The network may send 710 an ALERT message to the calling party and send 712 one or more network RBTs. The network RBT(s) may have been specified by called party to be played when someone calls them. The ringtone may be selected 714 by the calling party device, i.e., the initial RBT selection based on a phonebook entry and/or user input. Initially, this may be a default selection to the network RBT.

Figure 7B:
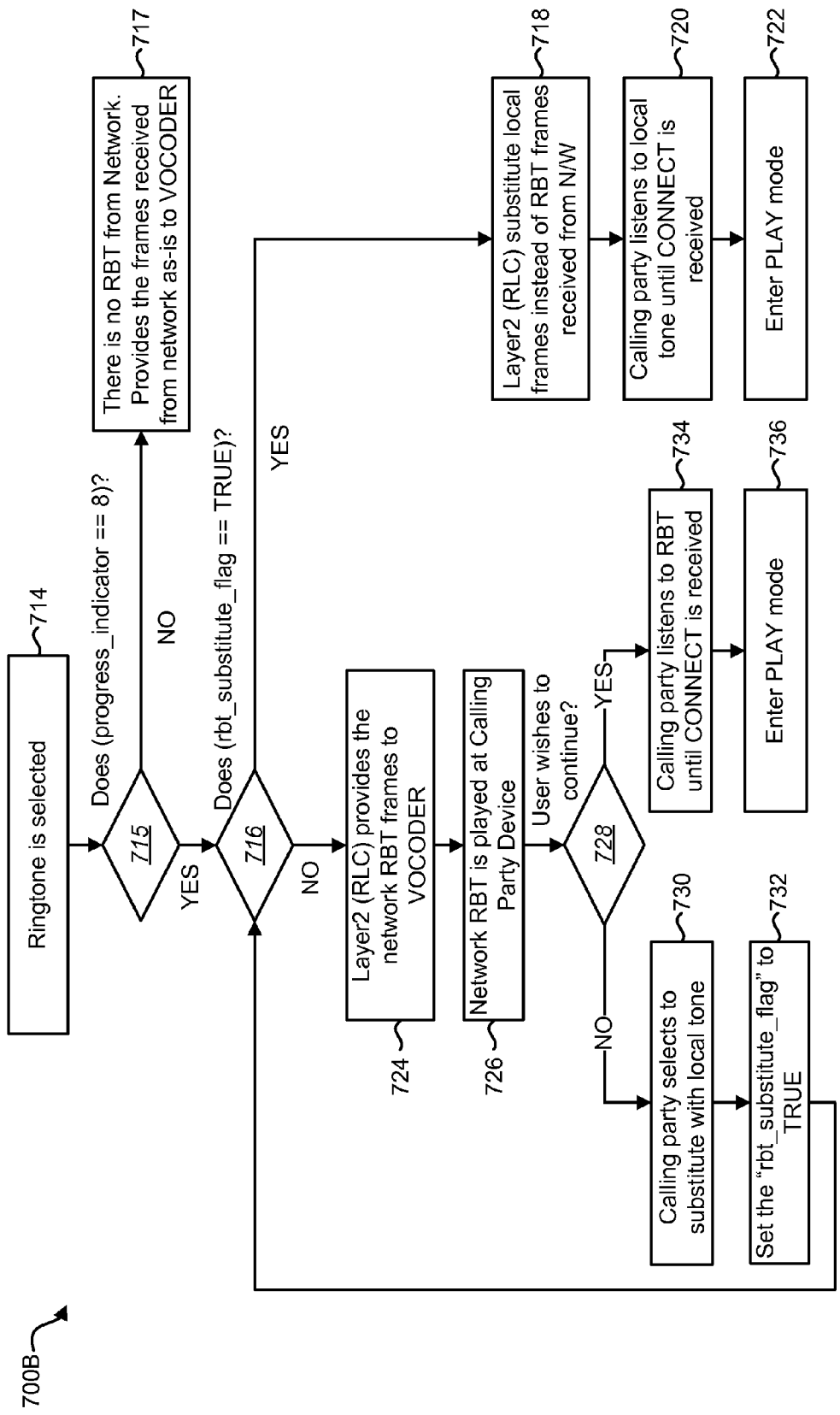
FIG. 7B is another flow diagram illustrating a method for providing an option to substitute a local ringback tone at a calling party device.

FIG. 7B is another flow diagram illustrating a method 700B for providing an option to substitute a local ringback tone at a calling party device. Specifically, the method 700B illustrated in FIG. 7B may be a continuation of the method 700A illustrated in FIG. 7A. Following initial ringtone selection 714, the calling party device may determine 715 if a progress indicator is equal to 8. If not, there is no RBT from the network and the layer 2 module may provide 717 the frames received from the network to the vocoder without modification. The progress indicator may describe events that occur during a phone call and a value of 8 may indicate that a network RBT is available. In other words, the network may send a progress indicator as 8 whenever it sends an RBT, so the progress indicator cannot be other than 8 if an RBT is sent. If a progress indicator is equal to 8, the calling party device may also determine 716 if the substitute flag is set to TRUE. The substitute flag may be set based on a pre-stored entry in the phonebook of the calling party device or based on user input (e.g., keypad input). In one configuration, entries in the phonebook of the calling party device may have one bit that indicates whether a local ringback tone should be substituted when attempting to call the number in that particular entry.

If the progress indicator equals 8 and the substitute flag is TRUE, the layer 2 module may substitute 718 local frames instead of network RBT frames received from the network, i.e., the vocoder may receive audio from the local queue instead of the radio link queue. In one configuration, when an ALERT message is received and a network ringback tone is received by the calling party device, the calling party device will screen the PRBT (network ringback tone) based on the settings in the phonebook for the user. If the user is not found in the phonebook, then the decision is based on the user input. Therefore, the calling party device may check local phonebook settings, local keypad input by the user or both before playing a network RBT or a local RBT. The phonebook and/or substitute flag entry in the phonebook may be part of a SIM card or other type of removable media. The calling party device may then listen 720 to the local ringback tone until a CONNECT message is received, at which time the substitute flag may be set to FALSE. The calling party device may also enter 722 PLAY mode. PLAY mode may be a mode in which the device may switch between a network RBT and a local RBT during runtime.

If, however, the progress indicator equals 8, but the substitute flag is FALSE, the radio link module may provide 724 audio from the radio link queue (network RBT frames) to the vocoder and the network RBT may be played 726 at the calling party device. The calling party device may determine 728 if the user wishes to continue, i.e., whether it has received any user input during runtime. Unless a user interrupts the network RBT with an indication to substitute with a local RBT, the network RBT may be played 734 until a CONNECT message is received and the device may enter PLAY mode 736. If the user of the calling party device indicates 730 the local RBT should be substituted, the substitute flag may be set 732 to TRUE and the calling party device may again determine 716 whether the progress indicator equals 8 and the substitute flag is TRUE. Therefore, at any time before the called party answers the call (or the call get connected), the calling party device user may switch between the network RBT and the local ringback tone.

Figure 8:
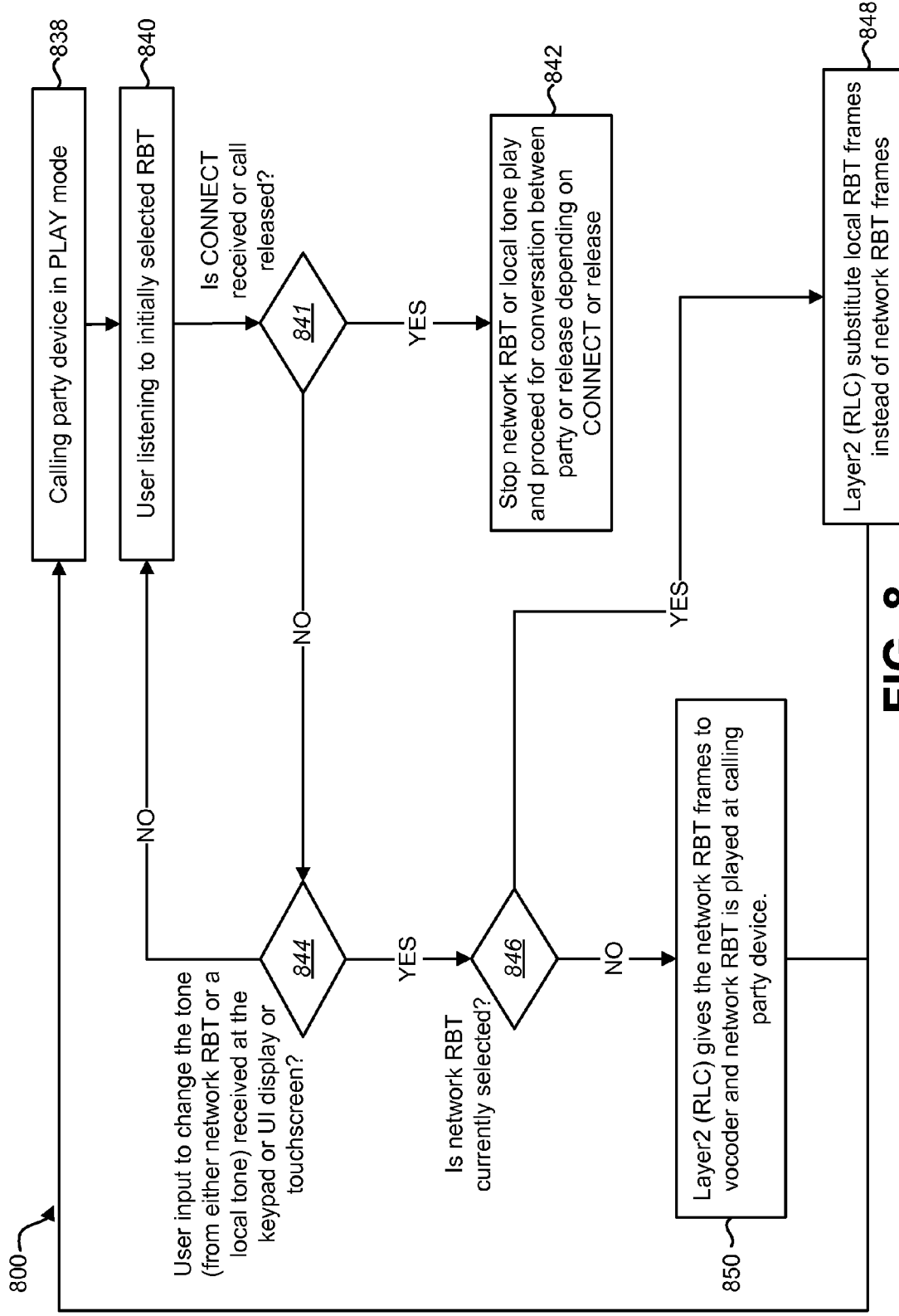
FIG. 8 is a flow diagram illustrating a method for switching between a network RBT and a local RBT during runtime, i.e., PLAY mode.

FIG. 8 is a flow diagram illustrating a method 800 for switching between a network RBT and a local RBT during runtime, i.e., PLAY mode. The method 800 may be performed by a calling party device. Upon entering 838 PLAY mode, a user may be listening 840 to an initially selected RBT. The calling party device may determine 841 whether a CONNECT message is received or the call is released before connection. If a CONNECT message is received or the call is released, the RBT (network or local) is stopped 842 and the call proceeds to a connection or release, respectively.

While the calling party device is playing a network ringback tone or substituting with a local ringback tone, the calling user may have an option of switching between a network RBT and local ringback tone. In other words, PLAY mode enables the calling device to switch between different RBTs during runtime. This may be achieved by a hot key on the terminal keypad or may be done through an option selection on a user interface. Therefore, the calling party device may determine 844 if it receives user input to change the tone, i.e., input on the keypad, user interface or touchscreen. If no input is received, the previously selected RBT may continue to be played 840. However, if user input indicating a desired RBT change is received, the calling party device may determine 846 whether the network RBT is currently selected. If the network RBT is currently selected and change is desired, then local RBT frames will be substituted 848 instead of the network RBT. Otherwise, if the network RBT is not currently selected and change is desired, the RLC frames received from network (i.e., network RBT) may be played 850 instead of the local RBT. The calling party device may then stay in play mode while it monitors for CONNECT messages (or call releases) and runtime user input. Therefore, the method 800 illustrates switching between a network RBT and a local RBT during runtime.

Figure 9:
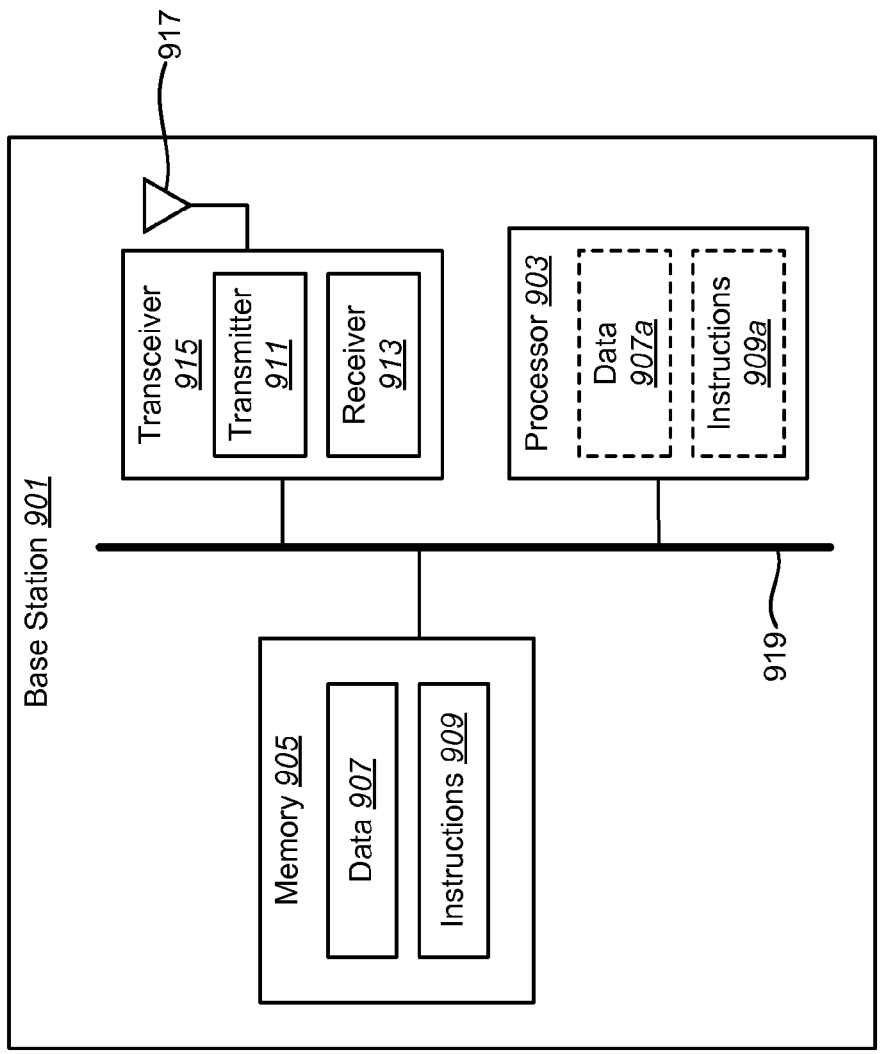
FIG. 9 illustrates certain components that may be included within a base station.

FIG. 9 illustrates certain components that may be included within a base station 901. The base station 901 may be one of the base stations 108, 124, 208, 508 illustrated in the previous figures.

The base station 901 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the base station 901 of FIG. 9, in an alternative configuration, a combination of processors (e.g., an ARM and DSP) could be used.

The base station 901 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 907 and instructions 909 may be stored in the memory 905. The instructions 909 may be executable by the processor 903 to implement the methods disclosed herein. Executing the instructions 909 may involve the use of the data 907 that is stored in the memory 905. When the processor 903 executes the instructions 909, various portions of the instructions 909*a* may be loaded onto the processor 903, and various pieces of data 907*a* may be loaded onto the processor 903.

The base station 901 may also include a transmitter 911 and a receiver 913 to allow transmission and reception of signals between the base station 901 and a remote location. The transmitter 911 and receiver 913 may be collectively referred to as a transceiver 915. An antenna 917 may be electrically coupled to the transceiver 915. The base station 901 may also include (not shown) multiple transmitters, multiple receivers, multiple transceivers and/or multiple antenna.

The various components of the base station 901 may be coupled together by one or more buses, which may include a power bus, a control signal bus, a status signal bus, a data bus, etc. For the sake of clarity, the various buses are illustrated in FIG. 9 as a bus system 919.

Figure 10:
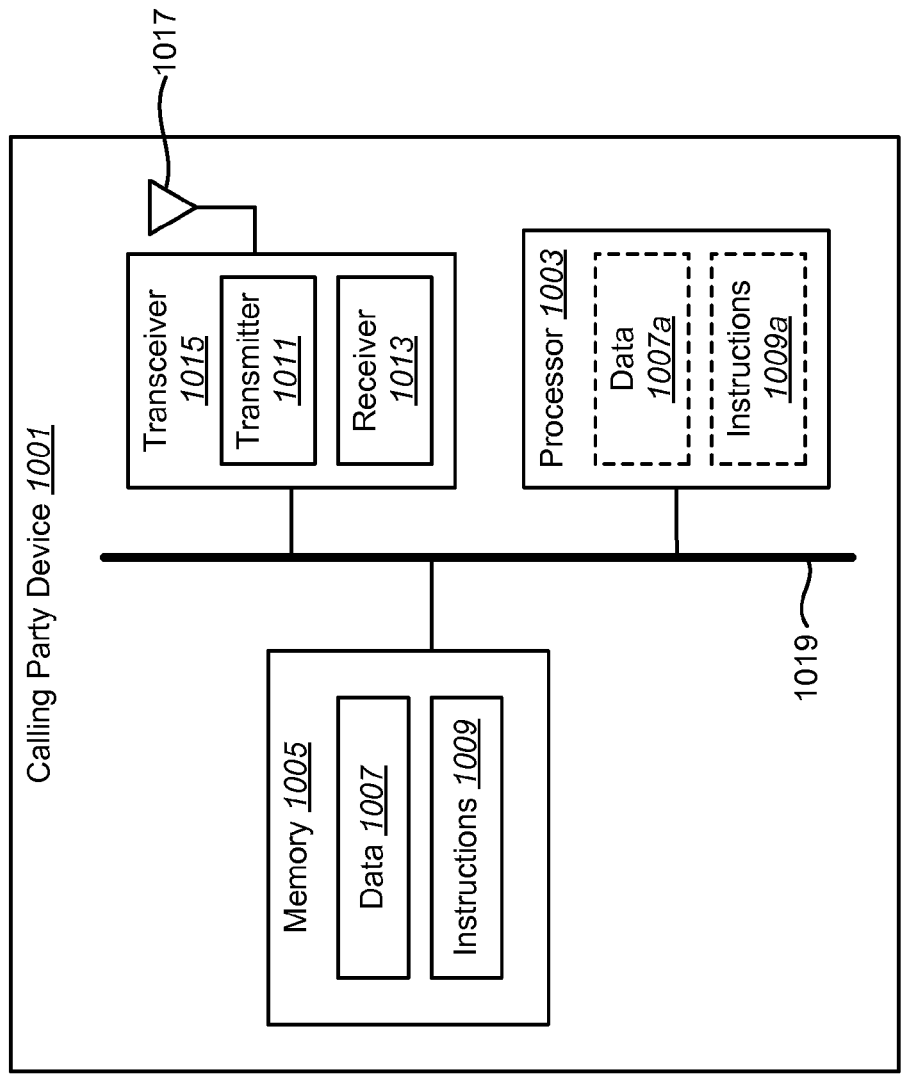
FIG. 10 illustrates certain components that may be included within a calling party device.

FIG. 10 illustrates certain components that may be included within a calling party device 1001. The calling party device 1001 may be the calling party device 102, 202, 502, 602 illustrated in the previous figures.

The calling party device 1001 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the calling party device 1001 of FIG. 10, in an alternative configuration, a combination of processors (e.g., an ARM and DSP) could be used.

The calling party device 1001 also includes memory 1005. The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1007 and instructions 1009 may be stored in the memory 1005. The instructions 1009 may be executable by the processor 1003 to implement the methods disclosed herein. Executing the instructions 1009 may involve the use of the data 1007 that is stored in the memory 1005. When the processor 1003 executes the instructions 1009, various portions of the instructions 1009a may be loaded onto the processor 1003, and various pieces of data 1007a may be loaded onto the processor 1003.

The calling party device 1001 may also include a transmitter 1011 and a receiver 1013 to allow transmission and reception of signals between the calling party device 1001 and a remote location. The transmitter 1011 and receiver 1013 may be collectively referred to as a transceiver 1015. An antenna 1017 may be electrically coupled to the transceiver 1015. The calling party device 1001 may also include (not shown) multiple transmitters, multiple receivers, multiple transceivers and/or multiple antenna.

The various components of the calling party device 1001 may be coupled together by one or more buses, which may include a power bus, a control signal bus, a status signal bus, a data bus, etc. For the sake of clarity, the various buses are illustrated in FIG. 10 as a bus system 1019.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3, 4, 7A, 7B and 8 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A method for playing a local ringback tone, comprising:
   calling a second party device from a calling party device;
   receiving an alert message indicating the calling party device is to play a network ringback tone;
   determining whether to play a pre-stored local ringback tone instead of the network ringback tone;

playing the local ringback tone or the network ringback tone based on the determination; and switching, at any time before call connection or call release, between the local ringback tone and the network ringback tone based on user input.

2. The method of claim 1, wherein the alert message comprises a specific parameter or information indicating that the network ringback tone is being sent to the calling party.

3. The method of claim 1, wherein the determining comprises determining if a substitute flag that indicates that the local ringback tone should be substituted for the network ringback tone is true.

4. The method of claim 3, further comprising setting the substitute flag to true based on an entry in a calling party device phonebook for the second party device.

5. The method of claim 4, further comprising setting the substitute flag to true based on user input received via a keypad on the calling party device only in the absence of an entry in the calling party device phonebook for the second party device.

6. The method of claim 3, wherein the playing comprises:
sending the local ringback tone to a vocoder in the calling party device if the substitute flag is true; and
sending the network ringback tone to the vocoder if the substitute flag is false.

7. The method of claim 1, wherein the network ringback tone is received from a network device.

8. The method of claim 1, further comprising:
receiving an indication message indicating that a connection has been made with the second party device; and
stopping the playing of the local ringback tone or network ringback tone in response to the indication message.

9. The method of claim 1, wherein the switching comprises switching based on user input from a hot key in a keypad of the calling party device or a selection within a user interface.

10. A calling party device for playing a local ringback tone, comprising:
a processor;
memory in electronic communication with the processor;
instructions stored in the memory, the instructions being executable by the processor to:
call a second party device;
receive an alert message indicating the calling party device is to play a network ringback tone;
determine whether to play a pre-stored local ringback tone instead of the network ringback tone;
play the local ringback tone or the network ringback tone based on the determination; and
switch, at any time before call connection or call release, between the local ringback tone and the network ringback tone based on user input.

11. The calling party device of claim 10, wherein the alert message comprises a specific parameter or information indicating that the network ringback tone is being sent to the calling party.

12. The calling party device of claim 10, wherein the instructions executable to determine comprise instructions executable to determine if a substitute flag that indicates that the local ringback tone should be substituted for the network ringback tone is true.

13. The calling party device of claim 12, further comprising instructions executable to set the substitute flag to true based on an entry in a calling party device phonebook for the second party device.

14. The calling party device of claim 13, further comprising instructions executable to set the substitute flag to true based on user input received via a keypad on the calling party device only in the absence of an entry in the calling party device phonebook for the second party device.

15. The calling party device of claim 12, wherein the instructions executable to play comprise instructions executable to:
send the local ringback tone to a vocoder in the calling party device if the substitute flag is true; and
send the network ringback tone to the vocoder if the substitute flag is false.

16. The calling party device of claim 10, wherein the network ringback tone is received from a network device.

17. The calling party device of claim 10, further comprising instructions executable to:
receive an indication message indicating that a connection has been made with the second party device; and
stop the playing of the local ringback tone or network ringback tone in response to the indication message.

18. The calling party device of claim 10, wherein the code executable to switch comprises code executable to switch based on user input from a hot key in a keypad of the calling party device or a selection within a user interface.

19. A calling party device for playing a local ringback tone, comprising:
means for calling a second party device;
means for receiving an alert message indicating the calling party device is to play a network ringback tone;
means for determining whether to play a pre-stored local ringback tone instead of the network ringback tone;
means for playing the local ringback tone or the network ringback tone based on the determination; and
means for switching, at any time before call connection or call release, between the local ringback tone and the network ringback tone based on user input.

20. The calling party device of claim 19, wherein the alert message comprises a specific parameter or information indicating that the network ringback tone is being sent to the calling party.

21. The calling party device of claim 19, wherein the means for determining comprises means for determining if a substitute flag that indicates that the local ringback tone should be substituted for the network ringback tone is true.

22. The calling party device of claim 21, further comprising means for setting the substitute flag to true based on an entry in a calling party device phonebook for the second party device.

23. The method of claim 22, further comprising means for setting the substitute flag to true based on user input received via a keypad on the calling party device only in the absence of an entry in the calling party device phonebook for the second party device.

24. The calling party device of claim 21, wherein the means for playing comprise:
means for sending the local ringback tone to a vocoder in the calling party device if the substitute flag is true; and
means for sending the network ringback tone to the vocoder if the substitute flag is false.

25. The calling party device of claim 19, wherein the network ringback tone is received from a network device.

26. The calling party device of claim 19, further comprising:
means for receiving an indication message indicating that a connection has been made with the second party device; and
means for stopping the playing of the local ringback tone or network ringback tone in response to the indication message.

27. The method of claim 19, wherein the means for switching comprise means for switching based on user input from a hot key in a keypad of the calling party device or a selection within a user interface.

28. A computer-program product for playing a local ringback tone, the computer-program product comprising a non-transitory computer-readable medium having instructions thereon, the instructions comprising:
    code for causing a calling party device to call a second party device;
    code for causing the calling party device to receive an alert message indicating the calling party device is to play a network ringback tone;
    code for causing the calling party device to determine whether to play a pre-stored local ringback tone instead of the network ringback tone;
    code for causing the calling party device to play the local ringback tone or the network ringback tone based on the determination; and
    code for causing the calling party device to switch, at any time before call connection or call release, between the local ringback tone and the network ringback tone based on user input.

29. The computer-program product of claim 1, wherein the alert message comprises a specific parameter or information indicating that the network ringback tone is being sent to the calling party.

30. The computer-program product of claim 28, wherein the code for causing the calling party device to determine comprises code for causing the calling party device to
    determine if a substitute flag that indicates that the local ringback tone should be substituted for the network ringback tone is true.

31. The computer-program product of claim 30, further comprising code for causing the calling party device to set the substitute flag to true based on an entry in a calling party device phonebook for the second party device.

32. The computer-program product of claim 31, further comprising code for causing the calling party device to set the substitute flag to true based on user input received via a keypad on the calling party device only in the absence of an entry in the calling party device phonebook for the second party device.

33. The computer-program product of claim 30, wherein the code for causing the calling party device to play comprises:
    code for causing the calling party device to send the local ringback tone to a vocoder in the calling party device if the substitute flag is true; and
    code for causing the calling party device to send the network ringback tone to the vocoder if the substitute flag is false.

34. The computer-program product of claim 28, wherein the network ringback tone is received from a network device.

35. The computer-program product of claim 28, further comprising:
    code for causing the calling party device to receive an indication message indicating that a connection has been made with the second party device; and
    code for causing the calling party device to stop the playing of the local ringback tone or network ringback tone in response to the indication message.

36. The computer-program product of claim 28, wherein the code for causing the calling party device to switch comprises code for causing the calling party device to switch based on user input from a hot key in a keypad of the calling party device or a selection within a user interface.

* * * * *